Sept. 2, 1924.  W. H. BEAL  1,507,227
TIE AND FASTENER
Filed Oct. 8, 1923
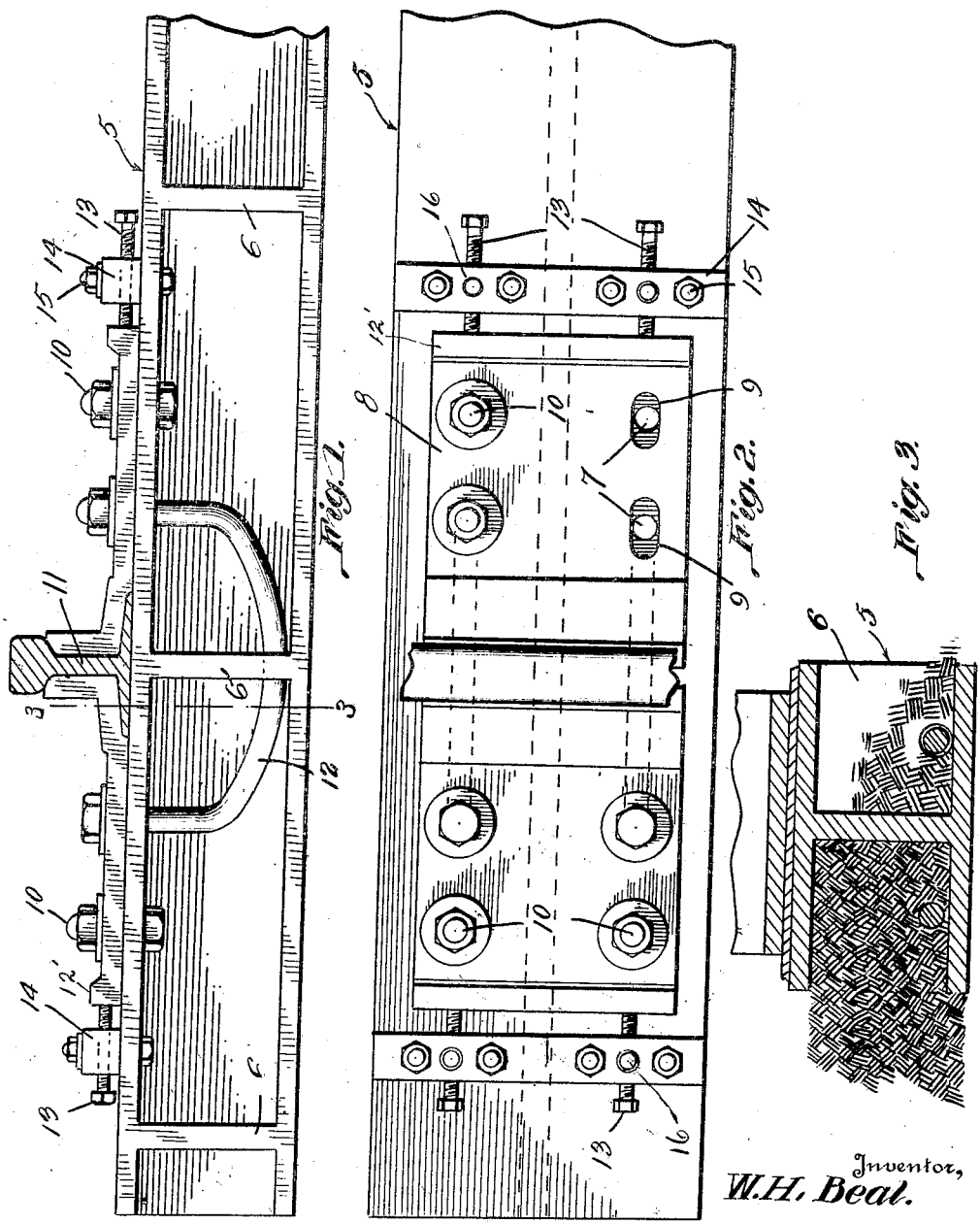
Inventor,
W. H. Beal.
By C. A. Snow & Co.
Attorneys Patented Sept. 2, 1924.

1,507,227

UNITED STATES PATENT OFFICE.

WILLIAM HENRY BEAL, OF PARIS, TEXAS.

TIE AND FASTENER.

Application filed October 8, 1923. Serial No. 667,290.

*To all whom it may concern:*

Be it known that I, WILLIAM HENRY BEAL, a citizen of the United States, residing at Paris, in the county of Lamar and State of Texas, have invented a new and useful Tie and Fastener, of which the following is a specification.

This invention relates to railway ties and fasteners, the primary object of the invention being to provide novel means for moving a fish plate into close engagement with the rail associated therewith, to insure a close fit between the fish plates and rail.

Another important object of the invention is to provide means for bracing the tie at a point directly under the rails supported thereon, eliminating any possibility of the tie sagging at the point of engagement with the rail.

A still further object of the invention is to provide means to permit the rail to be adjusted laterally while supported within the fish plates associated therewith, eliminating the necessity of removing the fish plate and spikes securing the same, to accomplish this adjustment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a portion of a tie constructed in accordance with the invention.

Figure 2 is a plan view thereof.

Figure 3 is a sectional view taken on line 3—3 of Figure 1.

Referring to the drawing in detail, the reference character 5 indicates generally the tie which is in the form of an I beam the same being provided with reinforcing ribs 6 disposed in spaced relation with each other to reinforce the tie at points throughout its length.

The upper surface of the tie is formed with openings 7 that receive the bolts employed for securing the fish plates 8 to the tie.

The fish plates are of particular construction and as shown, closely engage the web of the rail throughout the height thereof, while the upper edges of the fish plates contact with the lower edge of the tread of the rail. Elongated openings 9 are formed in the fish plates, which openings are disposed over the openings 7 of the tie so that the bolts 10 employed for securing the fish plates to the tie, may extend through the fish plates in a manner to allow slight lateral movement of the fish plates with respect to the tie to the end that the rail supported by the fish plates 8 will be permitted to move laterally adjusting the rails of a track to the proper gauge.

Disposed directly under the rail supported by the tie and which in the present showing is indicated at 11 are securing rods 12 that extend through suitable openings in the central rib 6 disposed under the rail, the ends of said rods extending upwardly from the registering openings of the tie and fish plates acting as truss rods to support the tie directly under the rail.

The outer ends of the fish plates are formed with enlargements 12' engaged by the set screws 13 that operate through threaded openings in the bars 14 which are also bolted to the tie by means of the bolts 15 whereupon movement of the set screws, when the nuts of the securing bolts 10 and rods 12 have been loosened will result in a relative movement of the fish plates to accomplish the adjustment of the rails supported thereby.

Oil openings 16 are provided in the bars 14 and are disposed directly over the set screws 13 whereby oil may be deposited on the screws 13 to permit them to be readily operated insuring a fine adjustment.

I claim:—

1. In a tie construction, spaced ribs forming a part of the tie, a pair of openings formed in one of the ribs, said tie having openings arranged in the upper wall thereof, fish plates on the tie and having openings adapted to register with the openings in the upper wall of the tie, securing rods extending through the openings in the rib, and having their upper ends extending into the registering openings of the fish plates and tie to lock the fish plates against movement and means engaging the ends of the fish plates for moving the fish plates.

2. In a tie construction, spaced ribs depending from the under surface of the upper wall of the tie, one of said ribs having a plurality of openings, securing rods extending through the openings and having upwardly extended ends, fish plates mounted on the tie and having elongated openings to accommodate the upper ends of the securing rods, adjusting screws operating at the ends of the fish plates for moving the fish plates with respect to each other, and nuts on the securing rods for holding the fish plates against movement.

In testimony that I claim the foregoing as my own, I have hereto affixed my signature in the presence of two witnesses.

WILLIAM $\overset{\text{his}}{\times}$ HENRY BEAL.
<div style="text-align:center">mark</div>

Witnesses:
S. L. BEDFORD,
R. G. COOK.